United States Patent [19]

Yates et al.

[11] 4,198,015

[45] Apr. 15, 1980

[54] IDEAL TRAJECTORY SHAPING FOR ANTI-ARMOR MISSILES VIA TIME OPTIMAL CONTROLLER AUTOPILOT

[75] Inventors: Robert E. Yates; John P. Leonard; Robert E. Alongi, all of Huntsville, Ala.

[73] Assignee: The United States of America as represented by the Secretary of the Army, Washington, D.C.

[21] Appl. No.: 910,307

[22] Filed: May 30, 1978

[51] Int. Cl.² ............................................. F42B 15/02
[52] U.S. Cl. .................................................. 244/3.15
[58] Field of Search ............................. 244/3.16, 3.15

[56] References Cited

U.S. PATENT DOCUMENTS

| | | |
|---|---|---|
| 2,821,349 | 1/1958 | Sohn ..................................... 244/3.15 |
| 2,951,658 | 9/1960 | Jones, Jr. et al. ................... 244/3.16 |
| 3,088,034 | 4/1963 | Jones, Jr. et al. ................... 244/3.16 |
| 3,097,816 | 7/1963 | Berry ................................... 244/3.15 |
| 3,695,555 | 10/1972 | Chadwick ........................... 244/3.16 |
| 4,123,019 | 10/1978 | Amberntson ....................... 244/3.16 |

Primary Examiner—Charles T. Jordan
Attorney, Agent, or Firm—Nathan Edelberg; Robert P. Gibson; James T. Deaton

[57] ABSTRACT

A missile system in which a missile is guided in a predetermined trajectory from launch or shortly thereafter in yaw by proportional navigation and in pitch first by a pitch programmer until said missile reaches a predetermined angle between a line of sight of a seeker of the missile and a centerline of the missile, then in pitch by a time optimal controller to direct the missile at a predetermined angle toward a target and finally by proportional navigation in pitch of the missile to the target.

4 Claims, 2 Drawing Figures

IDEAL TRAJECTORY SHAPING FOR ANTI-ARMOR MISSILES VIA TIME OPTIMAL CONTROLLER AUTOPILOT

DEDICATORY CLAUSE

The invention described herein may be manufactured, used, and licensed by or for the Government for governmental purposes without the payment to us of any royalties thereon.

CROSS REFERENCE TO RELATED APPLICATION

This application is related to applicants' copending application Ser. No. 885,721, filed Mar. 13, 1978 in that they are each concerned with guiding a missile along a predetermined trajectory to a target.

BACKGROUND OF THE INVENTION

In the past, known terminal guidance missile systems, other than applicants' previously filed application Ser. No. 885,721 dated Mar. 13, 1978, have included proportional navigation with limited trajectory shaping for high accuracy against moving targets. Limited use of trajectory shaping results in a flat approach trajectory which reduces warhead penetration or from a lofted or ballistic type trajectory. Ballistic-like trajectories are often unable to perform well under low cloud cover conditions. Therefore, it can be clearly seen that more flexible trajectory approach to the target is needed.

Accordingly, it is an object of this invention to provide a missile system that has a trajectory that can be varied in shape and in which the missile can be controlled in minimal time to dive on the target at a most advantageous angle of attack to the target.

Another object of this invention is to utilize a timed optimal controller in changing the course of the missile in minimum time when diving onto the target.

Still a further object of this invention is to provide a missile system in which the missile is guided in yaw by proportional navigation after launch to impact of the target and in pitch first by a pitch programmer, then by a timed optimal controller for turning the missile in pitch and finally by pitch proportional navigation to impact of the target.

Other objects and advantages of this invention will be obvious to those skilled in this art.

SUMMARY OF THE INVENTION

In accordance with this invention, a missile system is provided that includes launching a missile from ground or from a low flying aircraft in which the missile has a seeker thereon that is locked on a target at launch or shortly thereafter and in which the seeker feeds yaw rate signals to an autopilot which causes the missile to be guided in yaw. Also, as the missile is launched, a pitch programmer guides the missile in pitch until a predetermined angle between the missile body centerline and the seeker down looking line of sight is reached. Then, a threshold detector detects this predetermined signal from a pitch gimbal angle channel of the seeker and causes the pitch programmer to be disconnected from the autopilot and a time optimal controller to be connected to the pitch control surface actuators of the missile to cause the missile to turn in minimum time to the angle of impact with the target. After the missile has been turned to the desired relationship with the target, the threshold detector opens the circuit from the timed optimal controller to the missile pitch control surface actuators and closes a pitch rate channel from the seeker to the autopilot and then the missile is guided in proportional navigation to the target.

DESCRIPTION OF THE PREFERRED EMBODIMENT

Figure 1:
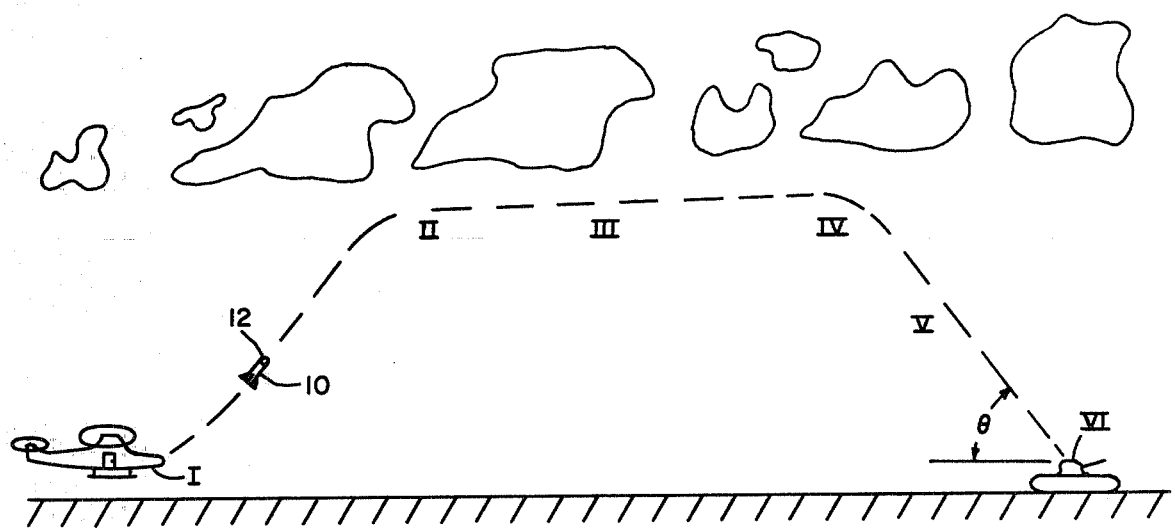
FIG. 1 illustrates a trajectory for a missile using the principle of the present invention.

Referring now to FIG. 1, a typical flight trajectory for a missile system utilizing the method of this invention is illustrated. Missile 10 has a terminal homing seeker 12 that is either a centroid tracker seeker such as a laser semi-active system or a contrast imaging seeker such as an infrared imaging seeker. Seeker 12 is used to acquire and lock onto the target. Missile 10 is launched with a nearly horizontal initial direction as shown at I. The launch at this point may be either low altitude aircraft launched or launched from a ground launcher. Missile 10 immediately climbs at a constant pitchup rate, then initiates a pitch down rate causing missile 10 to enter the cruise mode as indicated at II. Missile 10 then flies in the cruise mode during that portion of the flight indicated by III, i.e., that period of flight after pitch over to cruise and prior to the impact attitude transition phase initiated at IV. When the angle between the missile seeker line of sight, which is tracking the target, and the missile body centerline reaches a predetermined value at IV, a time optimal controller causes the missile to commence a time optimum attitude transition turn to cause the angle between the seeker line of sight and the missile body centerline to approach zero. When this turn is completed, the missile goes to proportional guidance at V and homes to target impact as indicated at VI.

Figure 2:
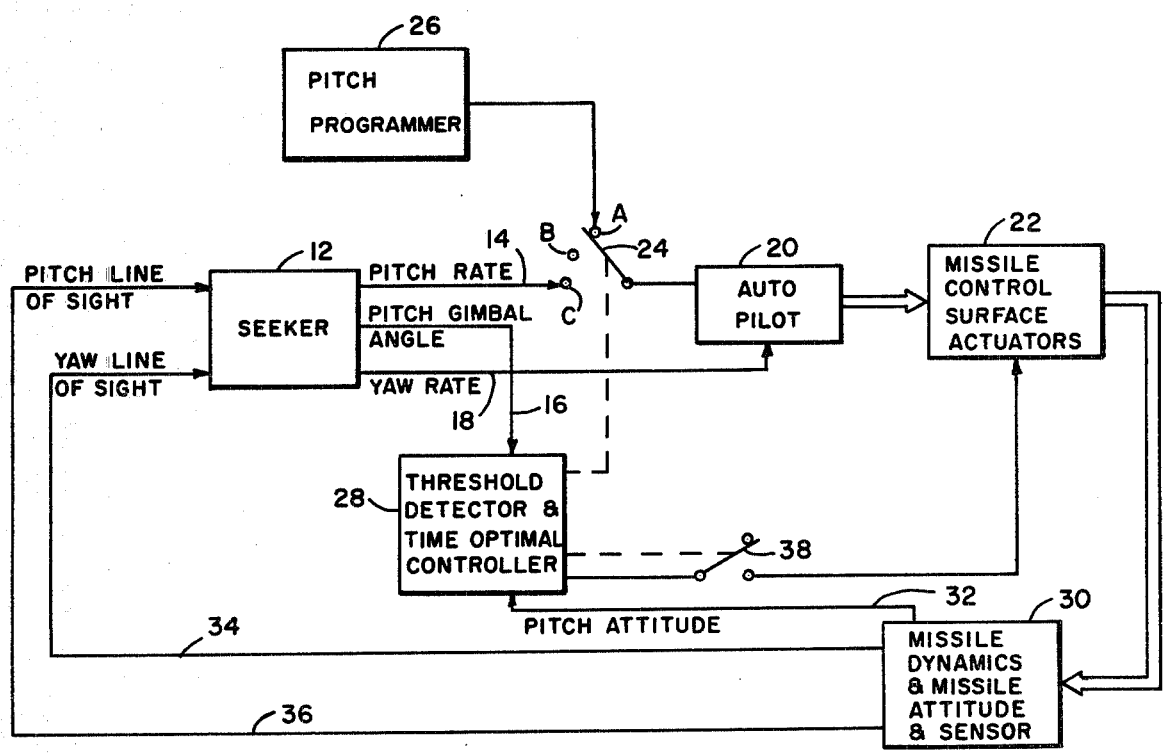
FIG. 2 is a block diagram of the guidance means used in achieving the predetermined trajectory of FIG. 1.

The guidance scheme for achieving the trajectory of FIG. 1 is illustrated in FIG. 2. Seeker 12 has three electrical outputs that include pitch rate channel 14, pitch gimbal angle channel 16 and yaw rate channel 18. Yaw rate channel 18 is directly connected to autopilot 20 for causing the missile to be guided in the yaw plane by conventional proportional navigation upon target acquisition by controlling actuation of yaw control surface actuator means of missile control surface actuators 22.

Pitch rate channel 14 is connected to autopilot 20 through switch 24 when switch 24 is in position C. Switch 24 at launch is in position A to connect pitch programmer 26 directly to autopilot 20 for causing missile 10 to be guided in pitch by controlling actuation of pitch control surface actuator means of missile control surface actuators 22. Pitch programmer 26 is programmed and utilized for controlling missile 10 in pitch to point VI of FIG. 1.

Pitch gimbal angle channel 16 is directly connected to threshold detector and time optimal controller 28. Missile attitude and sensor 30 also has a pitch attitude connection 32 connected to threshold detector and time optimal controller 28. Missile dynamics and missile attitude and sensor 30 also has feedback connections 34 and 36 to feed back the yaw and pitch line of sight signals of the missile. Time optimal controller 28 is connected through switch 38 to the pitch control surface actuator means of missile control surface actuators 22. At point IV, threshold detector and time optimal controller 28 sense a predetermined angle between the missile body centerline and the seeker down looking line of sight to the target. The predetermined angle is normally 70% to 90% of the desired impact attitude. When the predetermined angle is sensed, the threshold detector actuates switch 24 to position B to disconnect pitch programmer 26 and actuates switch 38 to connect the time optimal controller to the pitch control surface actuator means. With switch 38 closed, the time optimal controller applies full control surface movement to the pitch control actuator means to cause missile 10 to pitch down sharply toward the target. When the correct combination of gimbal angle value sensed via inputs 16 and 32, the time optimal controller causes full control surface movement to reverse the sharp or high downward momentum. This procedure is repeated automatically in a conventional time optimal manner by the time optimal controller until the missile centerline is pointing at the target as determined by the threshold detector. The time optimal controller then causes switch 38 to be actuated to the open position and switch 24 to be actuated to position C. The missile then flies to the target using proportional navigation utilizing signals from pitch rate channel 14 and yaw rate channel 18.

In operation, terminal homing seeker 12 is locked onto the selected target prior to launch or the terminal homing seeker acquires the target during the cruise phase. In either case, missile 10 is launched with a nearly horizontal initial direction as shown at I. The launch point may be from either a low altitude aircraft or a ground launcher. Pitch programmer 26 is initiated at launch causing the missile to enter the cruise mode as indicated at II for control of the missile in the pitch plane from launch through cruise III to attitude transition phase IV. The missile is guided in the yaw plane by conventional proportional navigation after target acquisition whether this occurs prior to or subsequent to launch. If the missile is launched without target acquisition, the yaw channel is controlled to zero deviation from the launch trajectory until acquisition occurs then guidance reverts to proportional navigation. During the cruise phase and after target tracking has occurred, threshold detector and time optimal controller 28 monitors the angle between the missile body centerline and seeker 12 down looking line of sight to the target in the pitch plane. When this angle exceeds a predetermined value (normally 70 to 90% of the desired impact attitude) the threshold detector causes switch 24 to move to position B and switch 38 to close. The time optimal controller then applies full control surface movement through switch 38 and missile control surface actuators 22 to cause the missile to pitch down toward the target. When a predetermined combination of gimbal angle value sensed via line 16 and the derivative of pitch attitude sensed via line 32 is sensed by the threshold detector and time optimal controller 28, full control surface movement is caused to reverse the high downward momentum. This procedure of the threshold detector and time optimal controller 28 is repeated automatically in a conventional time optimal manner by the time optimal controller until the missile centerline is pointing at a target as determined by the threshold detector. That is, the threshold detector and time optimal controller cycles and causes the missile to pitch down until the missile is pointing directly at the target. With this type procedure using the time optimal controller, the missile can be caused to turn more rapidly than with other arrangements. That is, by actuating the control surfaces of the missile at full control surface movement causes the missile to pitch down much quicker and at a steeper angle. With the missile pointing at the target, at about position V the time optimal controller then causes switch 24 to go to position C and switch 38 to open. From this point, the missile then flies to the target using proportional navigation in both pitch and yaw channels. That is, autopilot 20 is now receiving pitch rate signals through channel 14 and yaw rate signals through channel 18 to cause the missile to be guided in proportional navigation.

We claim:

1. A missile guidance system for guiding a missile in a predetermined trajectory to impact with a target, said trajectory including initial pitchup, cruise, and attitude transition portions, said guidance system including: a seeker carried by said missile for tracking said target; said seeker having a yaw rate channel that is directly connected to an autopilot for controlling flight of the missile by proportional navigation in the yaw plane; a pitch programmer connected to said autopilot for controlling flight of the missile in the pitch plane during said pitchup and cruise portions; and means for controlling the missile in pitch during said attitude transition portion including, threshold detector and time optimal controller means connected for receiving pitch gimbal angle signals from said seeker and pitch attitude signals from missile dynamics and missile attitude and sensor of the missile for causing said time optimal controller to apply full control surface movement to missile control surface actuator means of the missile to cause the missile to pitch down sharply toward the target under control of said time optimal controller.

2. A missile guidance system as set forth in claim 1, wherein said threshold detector and time optimal controller actuate switch means to disconnect said pitch programmer from said autopilot and to connect said time optimal controller to said missile control surface actuator means.

3. A missile system as set forth in claim 2, wherein said threshold detector and time optimal controller have means for disconnecting said time optimal controller from said missile control surface actuator means and for connecting a pitch rate channel of said seeker to said autopilot when said attitude transition portion is complete to adapt said autopilot for guiding said missile in proportional navigation in both pitch and yaw to target impact.

4. A missile system as set forth in claim 1, wherein said seeker is selected from the group consisting of a laser semi-active seeker and an infrared imaging seeker.

* * * * *